US012055897B2

(12) United States Patent
Maier et al.

(10) Patent No.: US 12,055,897 B2
(45) Date of Patent: Aug. 6, 2024

(54) DISPLAY MECHANISM WITH A SINGLE APERTURE

(71) Applicant: PATEK PHILIPPE SA GENEVE, Geneva (CH)

(72) Inventors: Frédéric Maier, Neuchâtel (CH); James Hide, Plan-les-Ouates (CH); Nicolas Boule, Chêne-Bourg (CH)

(73) Assignee: PATEK PHILIPPE SA GENEVE, Geneva (CH)

( * ) Notice: Subject to any disclaimer, the term of this patent is extended or adjusted under 35 U.S.C. 154(b) by 664 days.

(21) Appl. No.: 17/279,992

(22) PCT Filed: Sep. 26, 2019

(86) PCT No.: PCT/IB2019/058176
§ 371 (c)(1),
(2) Date: Mar. 25, 2021

(87) PCT Pub. No.: WO2020/065574
PCT Pub. Date: Apr. 2, 2020

(65) Prior Publication Data

US 2021/0397132 A1 Dec. 23, 2021

(30) Foreign Application Priority Data

Sep. 26, 2018 (EP) .................................... 18196793

(51) Int. Cl.
*G04B 19/253* (2006.01)

(52) U.S. Cl.
CPC ................................ *G04B 19/2534* (2013.01)

(58) Field of Classification Search
CPC .............. G04B 19/2534; G04B 19/202; G04B 19/046; G04B 19/247
See application file for complete search history.

(56) References Cited

U.S. PATENT DOCUMENTS 5,327,401 A * 7/1994 Besson ................ G04B 19/247 368/37
2005/0152225 A1* 7/2005 Dias ....................... G04B 19/25 368/77

(Continued)

FOREIGN PATENT DOCUMENTS

CH 12242/71 4/1974
CH 687 796 8/1997

(Continued)

OTHER PUBLICATIONS

Office Action issued in Japanese Patent Application No. 2021-516767 dated Jul. 24, 2023.

(Continued)

*Primary Examiner* — Edwin A. Leon
*Assistant Examiner* — Kevin Andrew Johnston
(74) *Attorney, Agent, or Firm* — NIXON & VANDERHYE

(57) ABSTRACT

Disclosed is a display mechanism for a timepiece, including a frame, an aperture which is fixed relative to the frame and a first and a second display disc each bearing indications, characterized in that it makes it possible to display the indications of the first and second discs alternately through the aperture. The invention also relates to a timepiece movement including such a mechanism, and to a timepiece such as a wrist watch, a pocket watch, a clock or a miniature clock including such a timepiece movement.

19 Claims, 10 Drawing Sheets

(56) References Cited

U.S. PATENT DOCUMENTS

| | | | | |
|---|---|---|---|---|
| 2010/0103780 | A1* | 4/2010 | Chaignat .............. | G04B 19/247 368/38 |
| 2015/0036465 | A1* | 2/2015 | Lagorgette ............... | G02B 5/26 368/37 |
| 2016/0161916 | A1 | 6/2016 | Francois | |

FOREIGN PATENT DOCUMENTS

| | | | | |
|---|---|---|---|---|
| CH | 704 343 | | 7/2012 | |
| CH | 707 971 | | 10/2014 | |
| CH | 707971 | A1 * | 10/2014 | ................ B26F 3/12 |
| DE | 738 177 | | 8/1943 | |
| EP | 1 536 299 | | 6/2005 | |
| EP | 2 180 383 | | 4/2010 | |
| JP | H05503784 | A | 6/1993 | |
| JP | 2010101896 | A | 5/2010 | |
| JP | 2016109681 | A | 6/2016 | |
| WO | 92/10794 | | 6/1992 | |

OTHER PUBLICATIONS

International Search Report for PCT/IB2019/058176, mailed May 26, 2020, 5 pages.
Written Opinion of the ISA for PCT/IB2019/058176, mailed May 26, 2020, 5 pages.

* cited by examiner

DISPLAY MECHANISM WITH A SINGLE APERTURE

This application is the U.S. national phase of International Application No. PCT/IB2019/058176 filed 26 Sep. 2019, which designated the U.S. and claims priority to EP Patent Application No. 18196793.6 filed 26 Sep. 2018, the entire contents of each of which are hereby incorporated by reference.

BACKGROUND OF THE INVENTION

Field of the Invention

The present invention relates to a display mechanism for a timepiece, more particularly to a mechanism for display in an aperture of a timepiece. The invention also relates to a timepiece movement comprising such a display mechanism as well as a timepiece such as a wristwatch, a pocket watch, a clock, or a miniature clock comprising such a movement.

DESCRIPTION OF THE RELATED ART

Traditionally, in watches equipped with a display of several pieces of information such as the date (day of the month), the current year or the day of the week, these pieces of information are displayed via different hands on a dial or are borne by distinct display discs, these discs being visible through different apertures. When it is desired to display many pieces of information in this way, it takes up space on the dial and thus reduces the unused surface for making decorations, for example.

Mechanisms allowing the display of several pieces of information at the same time in a single large aperture are also known. These have the disadvantage of lacking clarity and can lead to user confusion.

SUMMARY OF THE INVENTION

An aim of the invention is to provide a display mechanism which at least partially overcomes the aforementioned disadvantages.

To this end, the invention offers a display mechanism for a timepiece comprising a frame, an aperture which is fixed relative to the frame and a first and a second display disc, each bearing indications, characterized in that it makes it possible to display the indications of the first and second discs alternately through said aperture.

The invention also offers a timepiece movement comprising such a mechanism as well as a timepiece comprising such a timepiece movement. In a preferred embodiment of the invention, the mechanism comprises a control means manually operable by the user of said timepiece to change the disc at least one indication of which is readable through said aperture. In this case, said control means is typically operable from outside the case of said timepiece.

The mechanism according to the invention allows the display of information borne by different discs alternately through the same aperture. This alternation of the disc that is readable through the aperture is typically done manually, at the request of the user.

The pieces of information borne by the different discs are typically different indications, for example different temporal measures. Thus, the discs are movable relative to each other, and each of the first and second discs is rotated about its center of rotation at its own rate, typically different from that of the other disc.

BRIEF DESCRIPTION OF THE DRAWINGS

Other characteristics and advantages of the present invention will become apparent on reading the following detailed description given with reference to the accompanying drawings in which.

DESCRIPTION OF THE PREFERRED EMBODIMENTS

With reference to FIGS. 1*a* to 2*c*, a display mechanism 1 according to a first embodiment of the invention comprises a plate 100, a lever 101, a date disc 1051, a day disc 1052, and a means for controlling said lever 101.

Such a mechanism 1 is typically incorporated in a timepiece movement, for example in a timepiece such as a pocket watch, a wristwatch, a clock or a miniature clock.

Figure 1A:
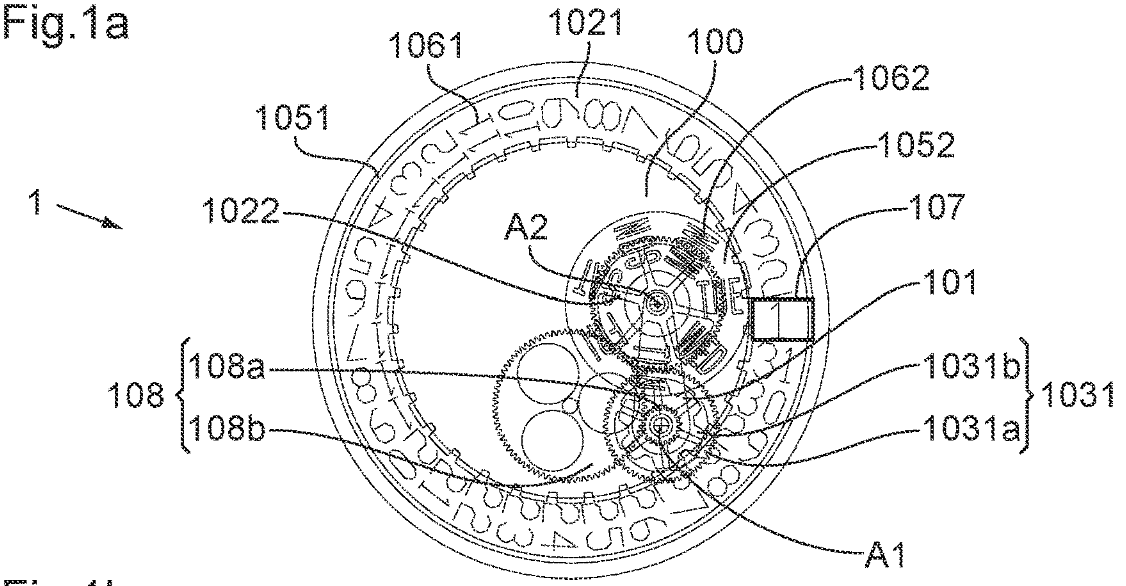
FIGS. 1*a* to 1*c* show, in top view and by transparency, part of a mechanism according to a first embodiment of the invention in successive configurations reached during its operation, said mechanism being adjusted to display the date.
Figure 1B:
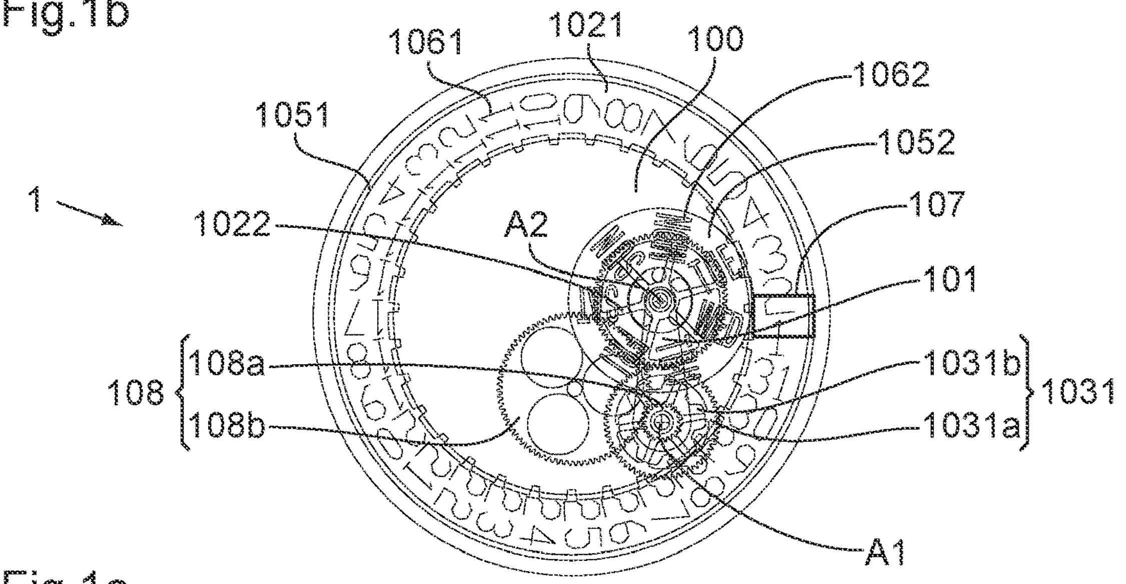
Figure 1C:
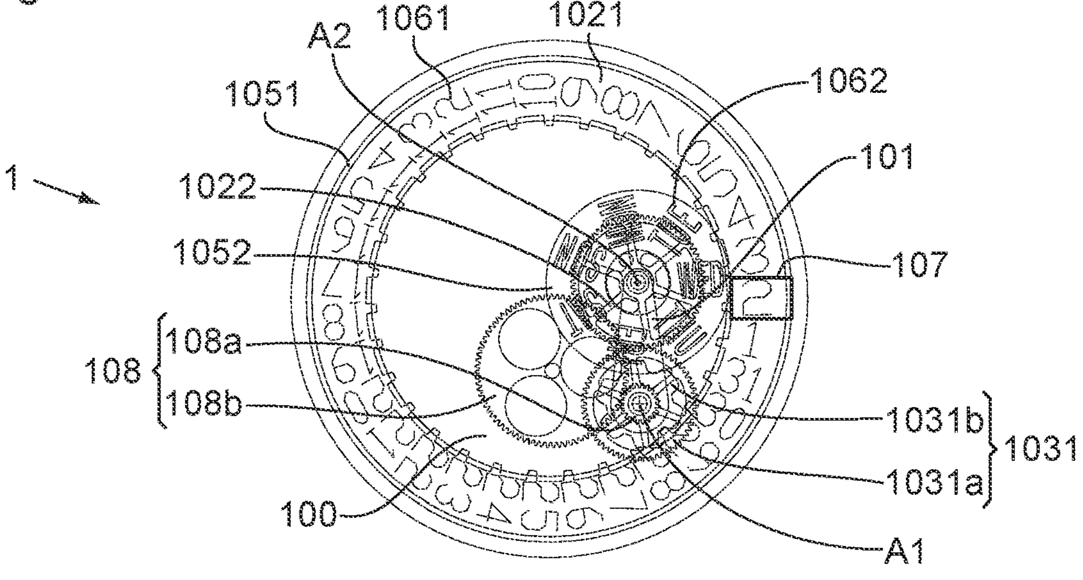

The date disc 1051, typically an annular disc, comprises a graduation 1061 comprising thirty-one indications, corresponding to the dates, uniformly distributed over a circumference of its upper surface. These indications are arranged in ascending order in the direction opposite to the direction of rotation of the date disc 1051, that is to say in the counterclockwise direction, and are intended to move in front of an aperture 107 typically made in a dial of a timepiece in which the display mechanism 1 is incorporated. In FIGS. 1*a* to 1*c*, the dial is not shown but the position of the aperture 107 is materialized. The date disc 1051 is typically carried by a ring 1021 having an internal toothing comprising thirty-one teeth and called date ring 1021. The date disc 1051 is for example glued, driven in, screwed or brazed on the ring 1021. Alternatively, the date disc 1051 could directly comprise the internal toothing.

The day disc 1052 has a graduation 1062 comprising seven indications corresponding to the names of the days of the week, these indications being uniformly distributed over a circumference of its upper surface. These indications 1062 are arranged in the chronological order of the days in the opposite direction to the direction of rotation of the day disc 1052, that is to say in the clockwise direction, and are intended to be read through the aperture 107 mentioned above. The day disc 1052 is typically carried by a toothed wheel 1022 called day wheel 1022. The day disc 1052 is for example glued, driven in, screwed or brazed on the toothed wheel 1022. Alternatively, the day disc could directly comprise the toothing.

The date disc 1051 and the day disc 1052 allow the display of different temporal measures and therefore have different rotational rates: one thirty-first of a revolution per day for the date disc 1051 and one sixth of a revolution per day for the day disc 1052.

The lever 101 is intended to pivot about an axis of rotation A1, which is fixed relative to the plate 100. It is rotated about this axis A1 by means of an actuating mechanism 108 comprising an actuating pinion 108*a* and an actuating wheel 108*b*, as shown in FIS. 1*a* to 2*c*. Typically, the actuating pinion 108*a* is fixed relative to the lever 101 and meshes with the actuating wheel 108*b*, the rotational movements of which are controlled by the user by means of an actuating means not shown such as a stem, one end of which is accessible from the outside of the timepiece in which the mechanism 1 is incorporated and the other end of which carries a rack meshing with the actuating wheel 108*b*.

The assembly comprising said actuating mechanism 108 and actuating means constitutes the "control means" of the display mechanism 1.

Independently of the actuating pinion 108*a*, the lever 101 carries a driving wheel assembly 1031 comprising a first toothed wheel 1031*a* with sixty teeth and a second toothed wheel 1031*b* with six teeth, these wheels being coaxial, rotationally fixed one relative to the other and free to rotate about the axis A1.

The first 1031*a* of the toothed wheels of this driving wheel assembly 1031 is kinematically connected to the going train of the timepiece movement in which the display mechanism 1 is incorporated so that the two wheels 1031*a*, 1031*b* of this wheel assembly typically perform one sixth of a revolution every 24 hours.

The second 1031*b* of the toothed wheels of this driving wheel assembly 1031 meshes with the internal toothing of the date ring 1021. It performs one pitch every 24 hours and rotates said ring 1021 by one pitch every 24 hours, thus changing the date display from one indication to the next every day.

The first 1031*a* of the wheels of said wheel assembly 1031 meshes with the day wheel 1022 which is carried by the lever 101. This day wheel 1022 is movable in rotation about an axis of rotation A2 which is distinct from the axis A1 and typically parallel to this axis A1, the axis A2 being fixed relative to the lever 101 and movable in rotation with respect to the plate 100. The gear ratio between this day wheel 1022 and the second wheel 1031*b* of the driving wheel assembly 1031 is such that this day wheel 1022 is rotated at a rate of one seventh of a revolution per day.

Figure 2A:
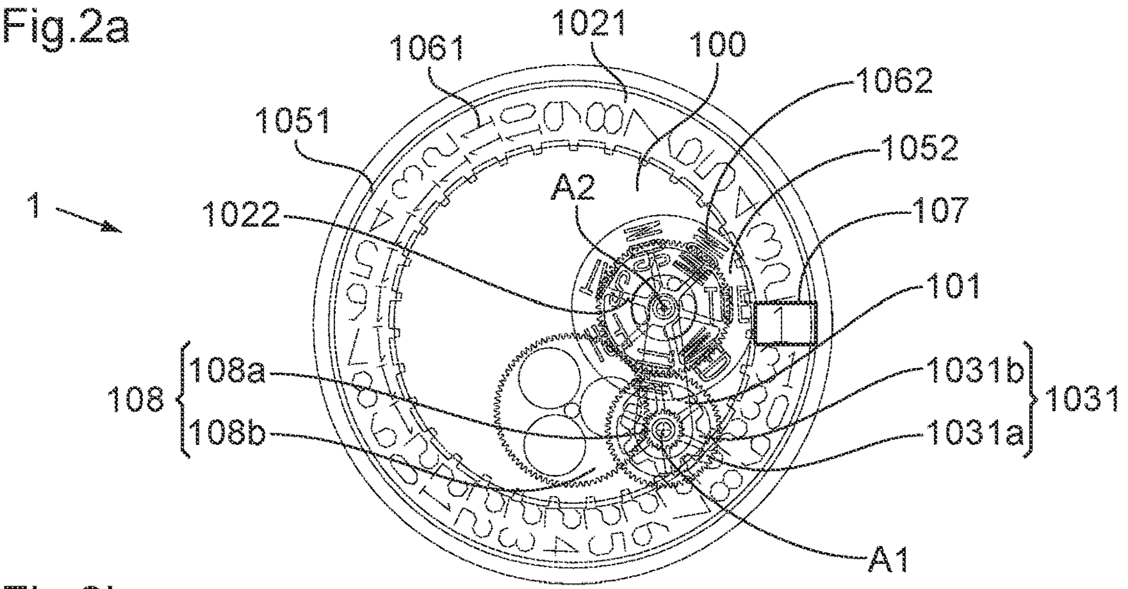
FIGS. 2*a* to 2*c* show, in top view and by transparency, part of the mechanism shown in FIGS. 1*a* to 1*c* in successive configurations during its operation during an adjustment allowing to switch from the display of the date to the display of the day of the week.
Figure 2B:
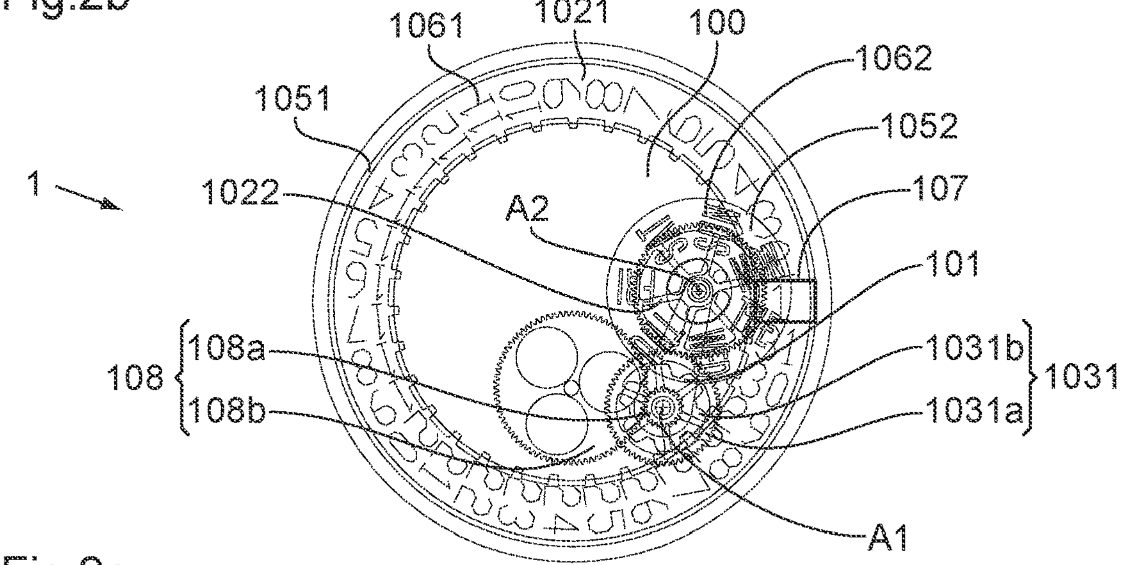
Figure 2C:
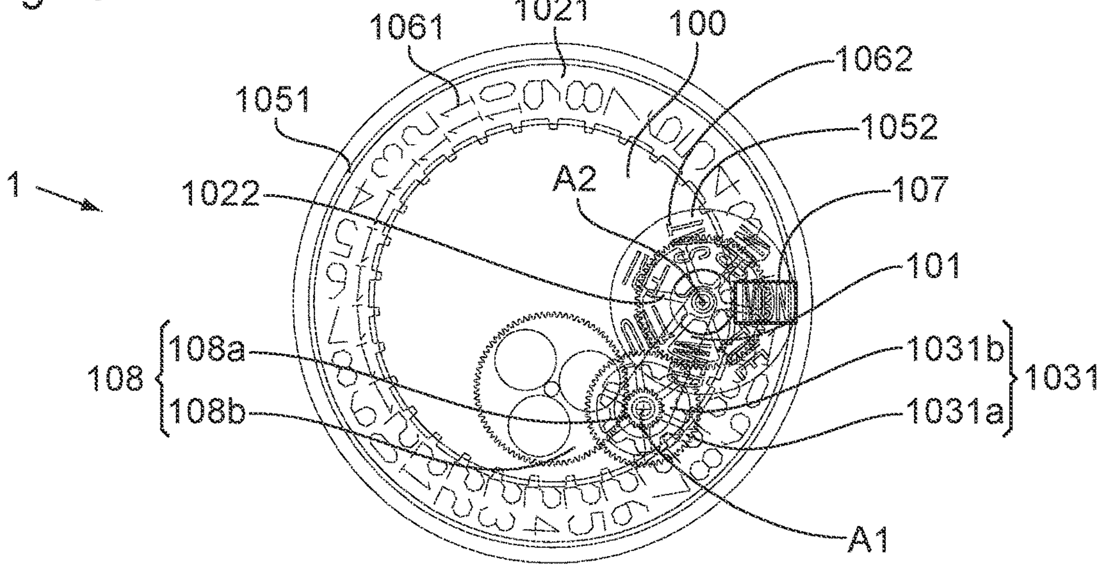

When actuated, the actuating mechanism 108 allows the lever 101 to be pivoted between two extreme positions, alternately from a first to a second extreme position and then from said second extreme position to said first extreme position. FIGS. 2*a* to 2*c* illustrate the transition from the first of said extreme positions to the second of said extreme positions when the actuating mechanism 108 is actuated via the actuating means. FIG. 2*b* represents an intermediate position between said two extreme positions.

In the first of these extreme positions, the end of lever 101 is away from the aperture 107 so that the day disc 1052 is positioned outside the field visible through the aperture 107. In this position, the day disc 1052 is intended to be almost completely or even completely under the dial. The date disc 1051, which is still positioned at least in part in front of the aperture 107, is therefore at least partially visible through the aperture 107. In this position, when the relative position of the date disc 1051 with respect to the aperture 107 allows it, an indication of the graduation 1061 corresponding to the date is fully readable through this aperture 107. This first extreme position of the lever 101 corresponds to that of FIG. 2*a* and is also represented in FIGS. 1*a* to 1*c*.

In the second of these extreme positions, the end of the lever 101 is close to the aperture 107 so that the day disc 1052 covers at least the part of the date disc 1051 located in front of the aperture 107, as illustrated in FIG. 2*c*. The date disc 1051 is then no longer visible through the aperture 107. In this position, when the relative position of the day disc 1052 with respect to the lever 101 allows it, an indication of the graduation 1062 corresponding to the name of the day is fully readable through this aperture 107, as in FIG. 2*c*.

The two extreme positions taken by the lever 101 during the operation of the display mechanism 1 define its angular displacement. In this example, it is approximately 30°. These extreme positions are reached on each alternation of the direction of rotation of the lever 101.

The display mechanism 1 is designed so that the relative position of the lever 101 with respect to the plate 100 does not impact the rotation of the day disc 1052 nor that of the date disc 1051. Indeed, the position of the center of rotation A1 is fixed during the revolving of the lever 101 so that the first wheel 1031*a* of the driving wheel assembly 1031 can be rotated continuously by the going train. Since the second wheel 1031*b* of the driving wheel assembly 1031 is fixed relative to it, it is permanently able to drive the date disc 1051 in rotation.

The day wheel 1022 and its axis of rotation A2 move with the lever 101, this wheel 1022 therefore meshes with the first toothed wheel 1031*a* whatever the position of the lever 101. The day disc 1052 is therefore rotated at a rate of one seventh of a revolution per day, whatever the position of the lever 101.

The display mechanism 1 according to the first embodiment of the invention which has just been described operates in a dragging manner but it could easily be modified to operate instantaneously (by jumps), that is to say typically in a few milliseconds. For this, the driving wheel assembly 1031 could comprise an additional starwheel with six teeth, coaxial and rotationally fixed relative to the first and second toothed wheels 1031*a*, 1031*b* of the driving wheel assembly 1031, this starwheel being driven in rotation instantaneously by one pitch every 24 hours under the effect of a finger carried by a lever carrying a feeler-spindle, said feeler-spindle being held against a snail kinematically connected to the going train of the timepiece movement in which said display mechanism 1 is incorporated and dropping suddenly every 24 hours.

The actuating means is typically designed to allow the display of the day of the week, either when held pushed or when kept pulled out, as desired. When the user releases the actuating means, the latter can be designed to automatically return to its initial position or can, on the contrary, remain blocked in the position that the user has just imposed on it until he activates it again.

In variants, it is clear that the actuating means could be different from the rack stem as described above.

In a first variant, this rack stem could for example be replaced with a connecting-rod system. Such a system would typically comprise a stem, one end of which would be accessible from the outside of the watch case and the other end of which would pivot freely around a pin fixed eccentrically on the actuating wheel 108*b* of the actuating mechanism 108 so as to drive the actuating wheel 108*b* in rotation in one direction then in the other direction during its back-and-forth movements In another variant, the rack stem could be replaced with a stem one end of which would be accessible from the outside of the watch case and the other end of which would be fixed to a first end of a spring cable wound around the axis of rotation of the actuating wheel 108*b*. The second end of this spring cable would be fixed to said axis of rotation so that the back-and-forth movements of said stem would cause the wheel 108*b* to rotate alternately in one direction and then in the other direction.

It would also be conceivable to modify the whole control means with respect to that described in the figures and not only the actuating means.

Such a display mechanism 1 has the advantage of allowing the display of two different pieces of information, in this example different temporal measures, alternately in the same aperture, the user being able, simply by acting on an actuating means, to control the lever 101 in order to choose the piece of information (date or day of the week) that he wishes to be able to read through the aperture 107. This allows not to overload the dial with multiple apertures while offering the user the possibility to learn about different pieces of information.

Figure 3:
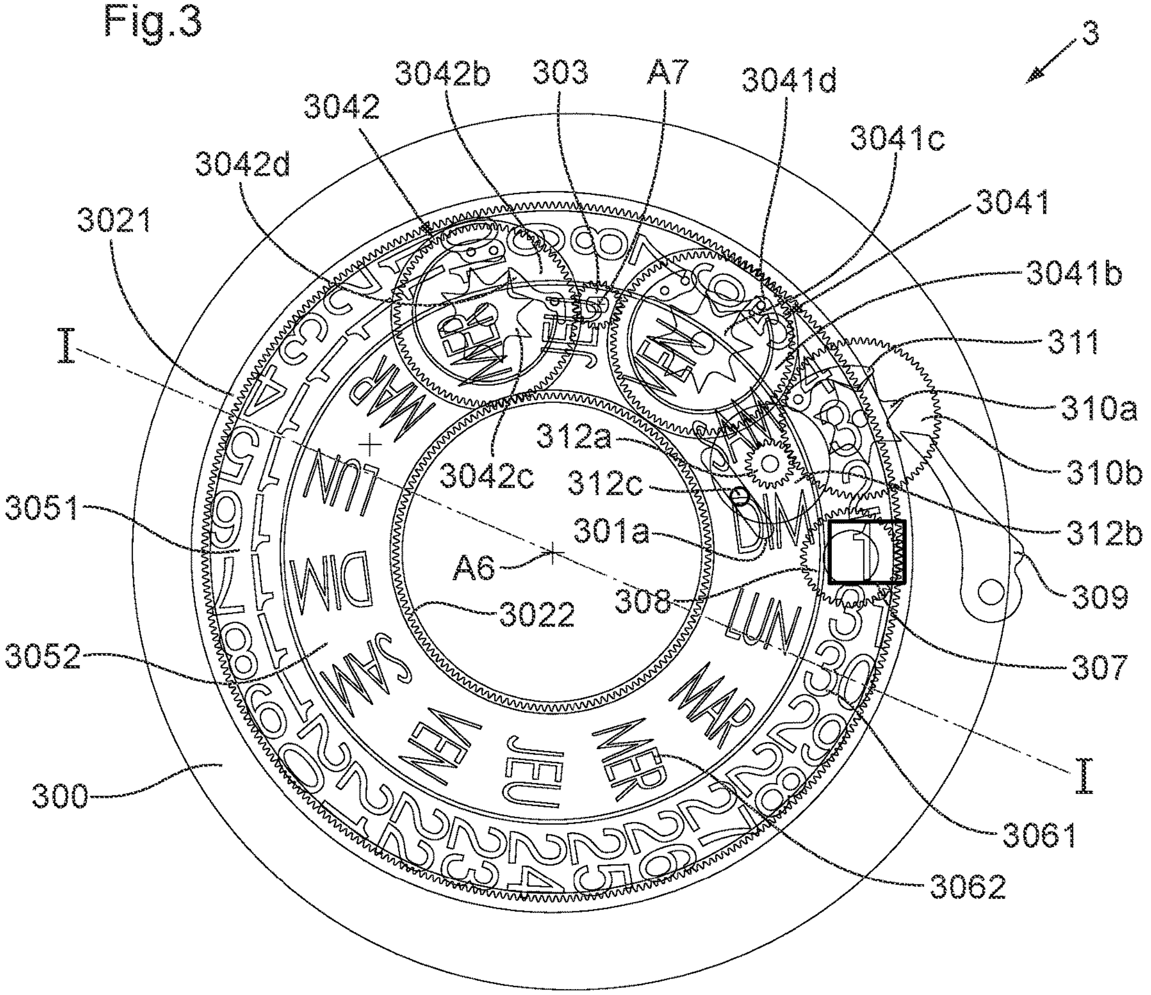
FIG. 3 shows, in top view and by transparency, a mechanism according to a second embodiment of the invention.
Figure 4:
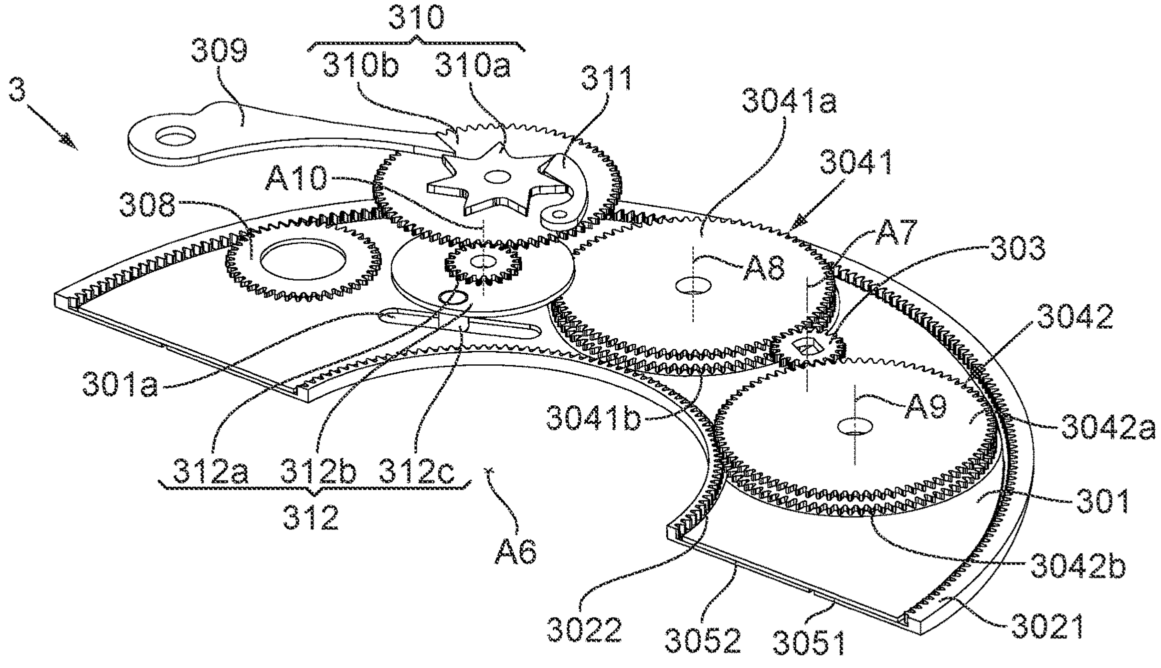
FIG. 4 illustrates in perspective and in bottom view a section along the axis I-I of the mechanism shown in FIG. 3.

Referring to FIGS. 3 and 4, a display mechanism 3 according to a second embodiment of the invention comprises a plate 300, a drive pinion 303 comprising twenty teeth pivoted on this plate and a support 301 on which are pivoted a date display disc 3051 which is fixed relative to a date ring 3021 comprising three hundred and ten teeth, a day display disc 3052 which is fixed relative to a day ring 3022 comprising one hundred and forty teeth, a date driving wheel assembly 3041 and a day driving wheel assembly 3042.

The display mechanism 3 also includes a correction wheel 308 and a control means.

Such a display mechanism 3 is typically incorporated in a timepiece movement, for example of a timepiece such as a pocket watch, a wristwatch, a clock or a miniature clock.

The date disc 3051 is typically an annular disc. It comprises a graduation 3061 comprising thirty-one indications corresponding to the dates ranging from 1 to 31, these indications being uniformly distributed over a circumference of its upper surface and intended to be read through an aperture 307 whose position is fixed with respect to the plate 300. The aperture 307 is typically made in a dial positioned above the display discs 3051, 3052. In FIGS. 3 and 5*a* to 7, the dial is not shown but the position of the aperture 307 is materialized.

The day disc 3052 is typically an annular disc. It comprises a graduation 3062 comprising fourteen indications corresponding to two series of the seven days of the week, these indications being uniformly distributed over a circumference of its upper surface and intended to be read through the aperture 307.

The date disc 3051 and the day disc 3052 allow the display of different temporal measures and therefore have different rotation rates: one thirty-first of a revolution per day for the date disc 3051 and one fourteenth of a revolution per day for the day disc 1052. In this example, they rotate in opposite directions.

As illustrated in FIGS. 3 to 7, the date disc 3051 and day disc 3052 are concentric. The day disc has a diameter smaller than the diameter of the date disc and is arranged inside the latter. The day and date discs are therefore in the same plane, which is typically parallel to the plate 300.

The display mechanism 3 makes it possible, on a user's order, to manually change the disc 3051, 3052 the information of which is readable through the aperture 307. The support 301 and the driving wheel assemblies 3041, 3042, the display discs 3051, 3052 and the toothed rings 3021, 3022 which it carries are intended to pivot about an axis of rotation A7, which is coincident with the axis of rotation of the drive pinion 303, between two extreme positions, thus changing the indication readable through the aperture 307. In this way, it can alternately display the day or the date.

To drive the support 301 in rotation, the user can act on an actuating means (not shown) which controls an actuating mechanism that the display mechanism 3 comprises. This actuating mechanism comprises an actuating lever 309, a first wheel assembly 310, a second wheel assembly 312 and a jumper 311, which are pivotably mounted in the frame 300.

The first wheel assembly 310 comprises a starwheel 310*a* with seven teeth and an actuating wheel 310*b* with seventy teeth which are coaxial and rotationally fixed one relative to the other. It is positioned by the jumper 311, the beak of which is held in abutment against the toothing of the starwheel 310*a* by a spring (also not shown).

The second wheel assembly 312 comprises a pinion 312*a* with twenty teeth which is coaxial, around an axis A10, with a circular plate 312*b* carrying an eccentric stud 312*c* and which is rotationally fixed relative to the circular plate 312*b*.

Referring to FIGS. 3 and 5*a* to 5*c*, actuation of the actuating means causes the lever 309 to pivot counterclockwise. The torque exerted by the lever 309 on the starwheel 310*a* causes the lifting of the jumper 311 which lets a tooth of the starwheel 310*a* pass and then repositions it. Thus, actuation of the actuating means causes the starwheel 310*a* to pivot by one pitch and the actuator wheel 310*b* to pivot by ten pitches in the clockwise direction. Since the actuating wheel 310*b* meshes with the pinion 312*a* of the second wheel assembly 312, this causes the rotation by half a turn of the second wheel assembly 312 and its stud 312*c* about the axis A10.

The support 301 comprises an oblong slot 301*a* in which the stud 312*c* of the second wheel assembly 312 slides. This support 301 is also guided in rotation about the axis A7. It is typically able to pivot about the axis A7 during the movements of the stud 312*c* in the oblong slot 301*a*, so that it only pivots during the rotation of the second wheel assembly 312, that is to say when the actuating means is actuated. Thus, each time the user acts on the lever 309 via the actuating means, the support 301 as well as the driving wheel assemblies 3041, 3042, display discs 3051, 3052 and toothed rings 3021, 3022 that it supports pivot about the axis A7 in one direction and then in the other direction between two extreme positions.

Figure 5A:
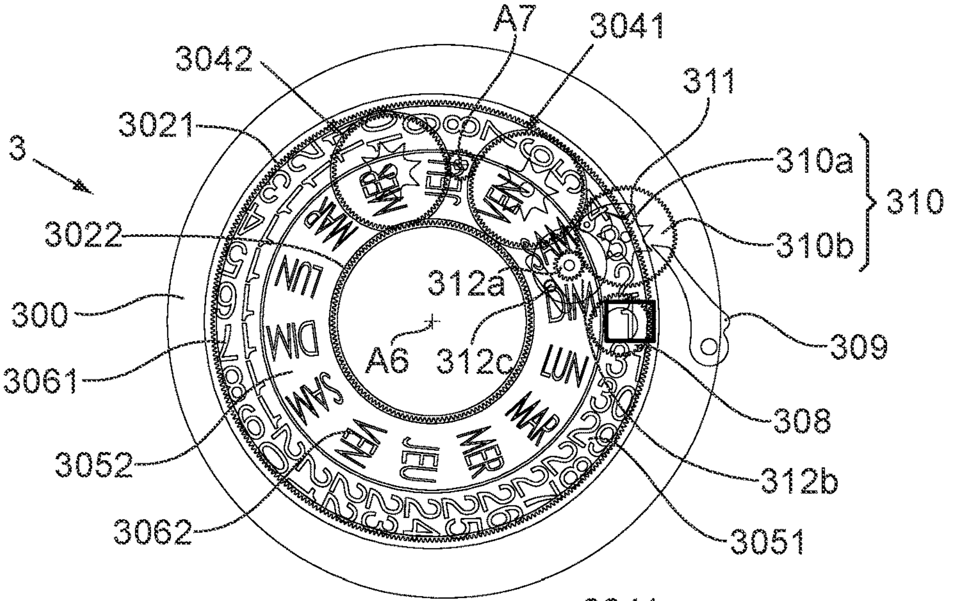
FIGS. 5*a* to 5*c* show, in top view and by transparency, the mechanism illustrated in FIG. 3 in successive configurations reached when an actuating means that it comprises is activated.

The first of these extreme positions corresponds to the position illustrated in particular in FIG. 5*a*. In this first extreme position, a part of the date disc 3051 is located in front of the aperture 307 so that one of the indications of the graduation 3061 corresponding to a date number, typically the indication "1", can be fully readable through this aperture 307. This first extreme position of the support 301 corresponds to a "date disc reading position".

Figure 5B:
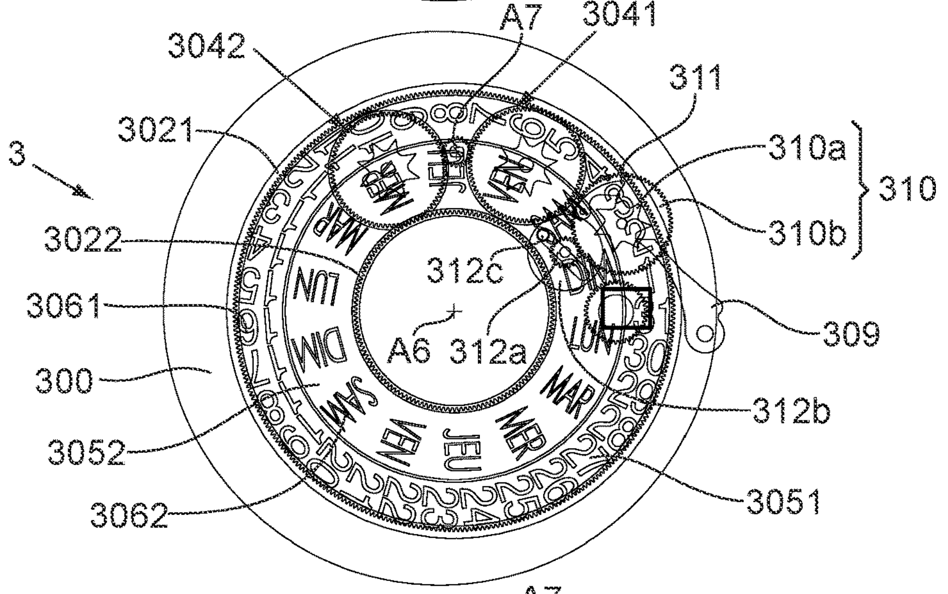
Figure 5C:
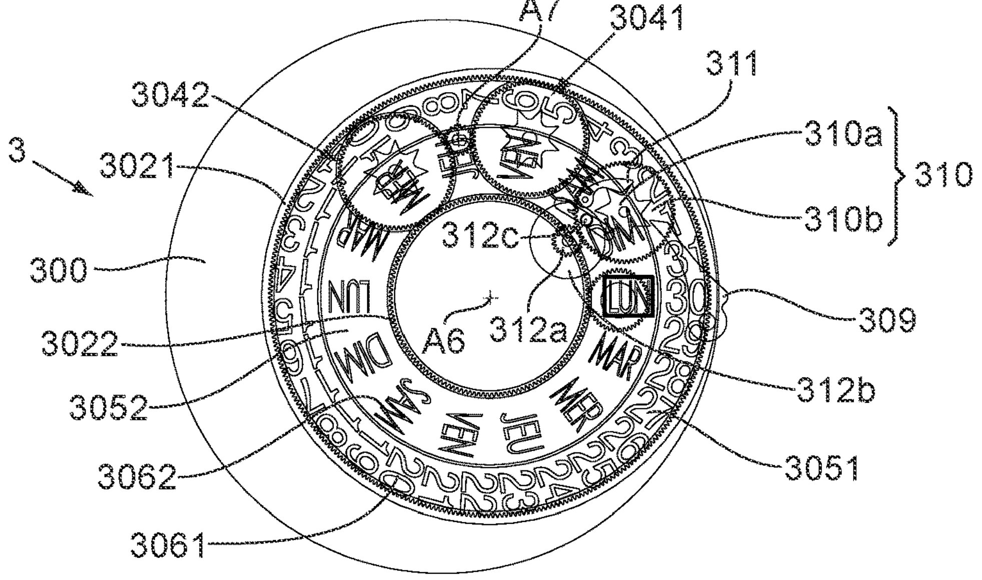

The second of these extreme positions corresponds to the position illustrated in particular in FIG. 5*c*. In this second extreme position, a part of the day disc 3052 is located in front of the aperture 307 so that one of the indications of the graduation 3062 corresponding to a day of the week can be fully readable through this aperture 307, typically the "LUN" (monday) indication. This second extreme position of the support 301 corresponds to a "day disc reading position".

FIG. 5*b* illustrates one of the configurations in which the display mechanism 3 is when the support 301 is moved between its two reading positions.

The axes of rotation of the various members of the actuating mechanism are fixed relative to the plate 300 during the transition from one reading position to another.

The assembly comprising the actuating mechanism and the actuating means constitutes a "control means" of the mechanism 3.

The display mechanism 3 is designed so that, regardless of the reading position in which it is, every day, typically instantaneously at midnight, the date disc 3051 performs one thirty-first turn clockwise and the day display disc 3052 performs one fourteenth of a turn counterclockwise about a common axis of rotation A6 which is fixed with respect to the support 301 and which corresponds to the common center of the date disc 3051 and the day disc 3052 considered in top view. Since this axis A6 is fixed relative to the support 301, it is obviously movable relative to the plate 300 when the user acts on the actuating means to change the reading position.

Figure 6A:
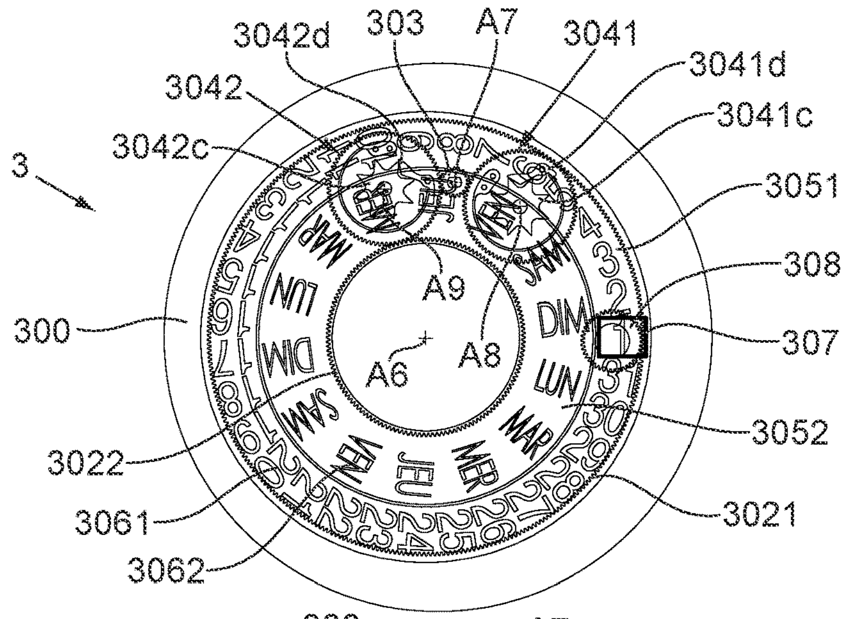
FIGS. 6*a* to 6*c* illustrate in top view and by transparency the mechanism illustrated in FIG. 3 in successive configurations reached during its operation, said mechanism being adjusted to display the date.
Figure 6B:
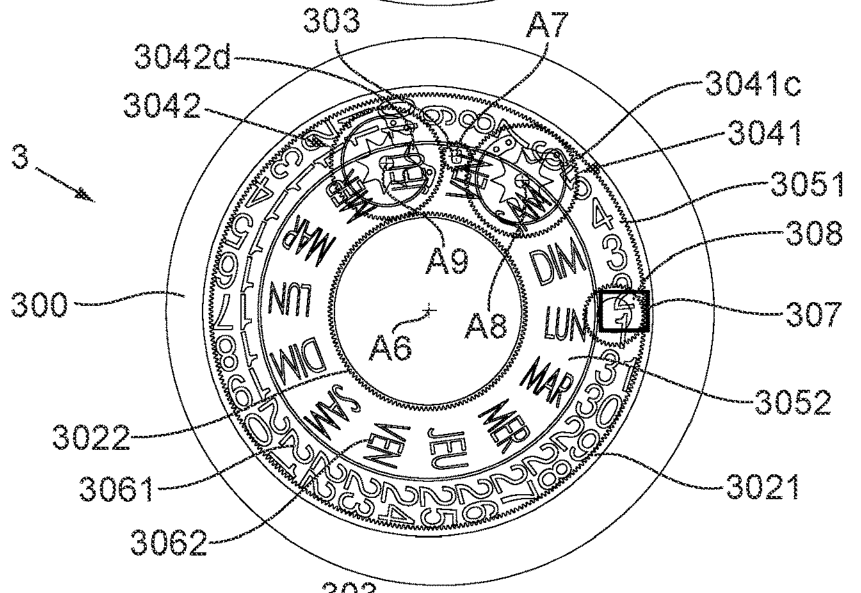
Figure 6C:
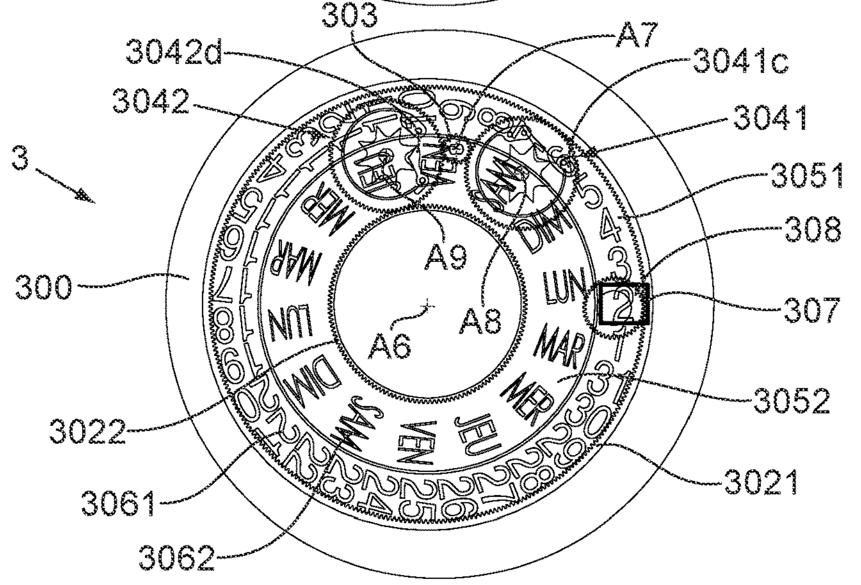
Figure 7:
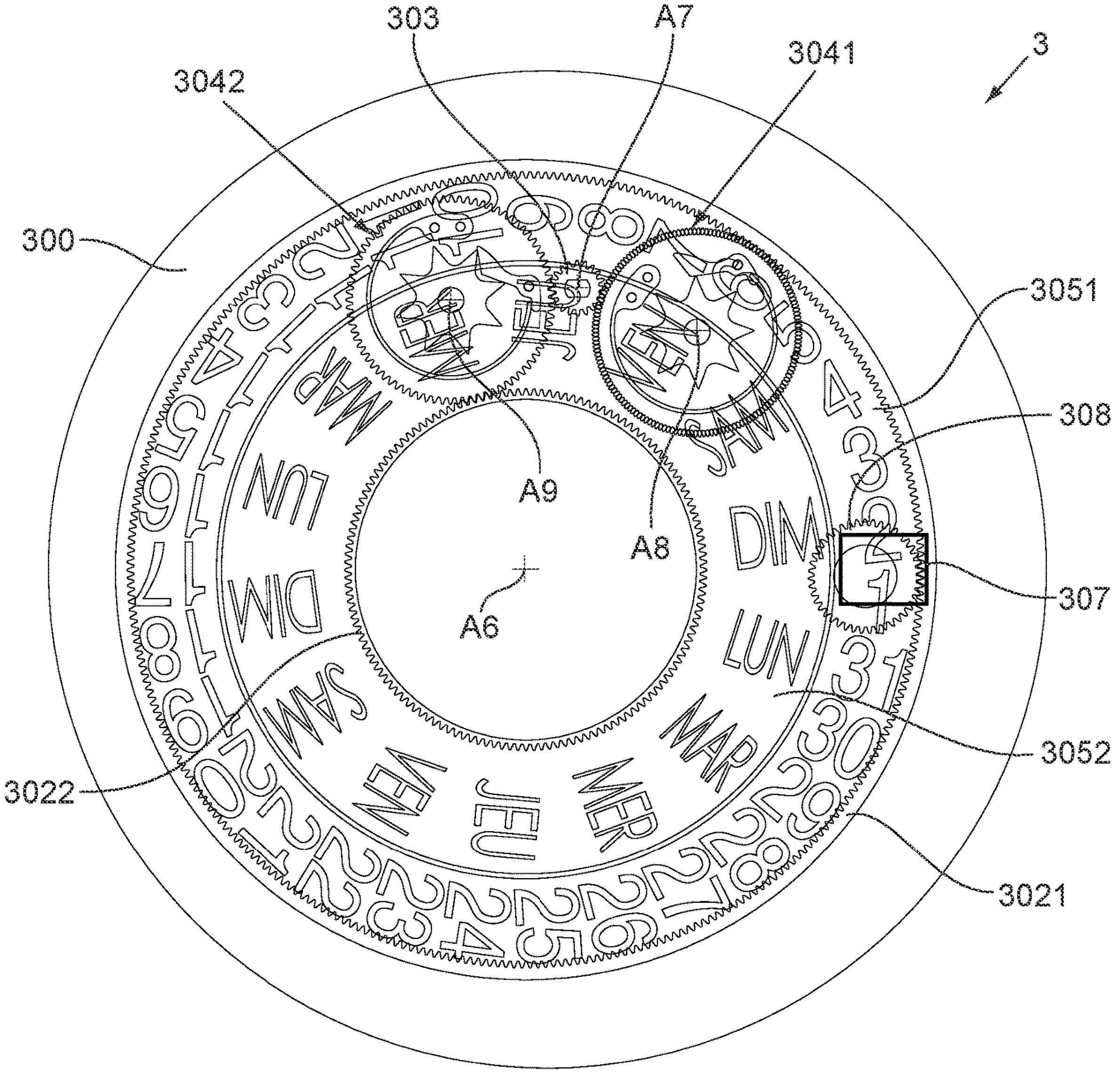
FIG. 7 illustrates in top view and by transparency the mechanism illustrated in FIG. 3 in a configuration taken during the correction of the date.

The drive pinion 303 is kinematically connected to the going train (not shown) of the timepiece movement in which the display mechanism 3 is incorporated so as to instantly perform half a turn in the counterclockwise direction (in top view) every day at midnight, as shown in FIGS. 6*a* to 6*c*. The rest of the time, the pinion 303 is motionless relative to the plate 300.

When it rotates, the drive pinion 303 simultaneously drives in rotation the date and day wheel assemblies 3041, 3042 which in turn drive in rotation the date and day display discs 3051, 3052 via their toothed rings 3021, 3022.

The operation of this mechanism 3 is described in more detail in the following part.

To begin with, the date driving wheel assembly 3041 comprises a lower date wheel 3041*a*, an upper date wheel 3041*b* and a starwheel 3041*c* which are coaxial around an axis A8, as well as a jumper 3041*d* (on-board) which is fixed to the upper date wheel 3041*b* and which positions the latter relative to the starwheel 3041*c*. The starwheel 3041*c* of this wheel assembly 3041 comprises eight teeth and is fixed relative to the lower date wheel 3041*a* which comprises eighty teeth. The upper wheel 3041*b* is identical to the lower wheel 3041*a* and therefore also comprises eighty teeth. It is free to rotate with respect to the lower wheel 3041*a* and typically meshes with the toothing of the date ring 3021.

The day driving wheel assembly 3042 is identical to the date driving wheel assembly 3041, it comprises a lower day wheel 3042*a*, an upper day wheel 3042*b* and a starwheel 3042*c* which are coaxial around an axis A9, as well as a jumper 3042*d* (on-board) which is fixed to the upper day wheel 3042*b* and which positions the latter relative to the starwheel 3042*c*. The starwheel 3042*c* of this wheel assembly 3042 comprises eight teeth and is fixed relative to the lower day wheel 3042*b* which comprises eighty teeth. The upper wheel 3042*b* is identical to the lower wheel 3042*a* and therefore also comprises eighty teeth. It is free to rotate with respect to the lower wheel 3042*a* and meshes with the toothing of the day ring 3022.

Finally, the drive pinion 303 simultaneously meshes with the lower wheels 3041*a*, 3042*a* of the display wheel assemblies 3041, 3042, respectively.

Referring to FIGS. 6*a* to 6*c*, when the drive pinion 303 pivots by half a turn (i.e. ten teeth) counterclockwise, this causes the clockwise rotation, by one eighth of a turn, of the lower date wheel 3041*a* and of the starwheel 3041*c* which are fixed one relative to the other. The position of the beak of the jumper 3041*d* is such that the rotation of the starwheel 3041*c* by one eighth of a turn, i.e. one pitch, clockwise causes the upper wheel 3041*b* of the date wheel assembly 3041 to rotate by one eighth of a turn, corresponding to ten pitches, clockwise. Indeed, the jumper 3041*d* does not allow the tooth of the starwheel 3041*c* that pushes it to pass through and follows the movements of this starwheel. The upper wheel 3041*b* then drives the date ring 3021 in rotation by ten pitches clockwise which corresponds to a rotation of one thirty-first of a revolution of the date display disc 3051 about the axis A6 clockwise, as shown in FIGS. 6*a* to 6*c*.

Since the day driving wheel assembly 3042 is identical to the date driving wheel assembly 3041, in parallel with its effect on the date display disc 3051, the rotation of the drive pinion 303 by half a turn counterclockwise results in rotating the day ring 3022 by ten pitches counterclockwise which corresponds to a rotation by one fourteenth of a turn of the day display disc 3052 about the axis A6 counterclockwise, as illustrated in FIGS. 6*a* to 6*c*.

Since the revolving of the support 301 from one reading position to another is done about the axis of rotation A7, which is also the axis of rotation of the drive pinion 303, the kinematic connection between the drive pinion 303 and the display discs is not modified during this revolving.

Since the drive pinion 303 is motionless during this revolving, it causes each of the display discs 3051, 3052 to rotate slightly with respect to the carrier 301 about the axis A6. This slight rotation is of course taken into account in the arrangement of the display discs 3051, 3052 with respect to the aperture 307 so that, whatever the reading position of the display mechanism 3, a date indication 3061 or an indication of the days 3062 is fully readable through the aperture 307.

Advantageously, the display mechanism 3 allows the correction of the date and of the day of the week independently, that is to say, it makes it possible to correct the date without impacting the day of the week and vice versa.

Typically, only the indication visible in the aperture 307 can be corrected. Thus, to perform a correction of the display of the date, the user must place the display mechanism 3 into the reading position of the date disc.

In this position, the correction wheel 308, whose center of rotation is fixed relative to the frame 300, meshes with the date ring 3021. Thus, its rotation, in one direction or the other, drives that of the ring 3021, which changes the display of the date. Since the ring 3021 meshes with the upper wheel 3041*b* of the date driving wheel assembly 3041, the upper wheel 3041*b* is also rotated during the correction of the date. However, as the starwheel 3041*c* is fixed relative to the lower date wheel 3041*a* which meshes with the drive pinion 303 which is then stationary, the rotation of the upper date wheel 3041*b* does not cause the rotation of the starwheel 3041*c* nor of the wheel 3041*a* which is fixed relative to it. Indeed, when the upper date wheel 3041*b* pivots by one eighth of a turn during a correction of the date by one step, the jumper 3041*c* lifts and lets a tooth of the starwheel 3041*c* pass. The lower date wheel 3041*a* therefore shifts by one eighth of a turn from the upper date wheel 3041. This can be seen in FIG. 7 which illustrates the mechanism 3 during the correction of the date.

Thus, the display mechanism 3 makes it possible to correct the date without correcting the day.

When the day is visible in the aperture 307, the correction wheel 308 meshes with the day ring 3022 and makes it possible, in the same way, to correct the day without correcting the date.

The correction wheel 308 is typically operable from outside the timepiece in which the mechanism 3 is incorporated, for example by means of a stem one end of which is accessible from outside said timepiece and the other end of which carries a toothed wheel meshing, when the user wants, for example in a pulled position, with the correction wheel 308.

The assembly comprising the eight-teeth starwheel 3041*c* and the jumper 3041*d* of the date driving wheel assembly 3041 ensures the positioning of the upper wheel 3041*b* of this wheel assembly and of the date disc 3051 which meshes with it via the toothed ring 3021, in an angular position in which a date indication can be fully visible through the aperture 307.

A low-intensity impact, that is to say an impact generating a torque causing a small rotation of the date disc 3051, typically a rotation by an angle corresponding to less than five teeth of the ring 2021 associated with the date disc, would ultimately have no consequence. Indeed, such a small rotation of the date disc 3051 would generate a rotation of the upper date wheel 3041*b* which would be insufficient for the jumper 3041*d* that it carries to jump a tooth of the date starwheel 3041*c*. Under the effect of the return force of the spring of jumper 3041*d*, the upper date wheel 3041*b* and the date disc 3051 would recover the place they occupied before the impact.

Likewise, during a date correction, the assembly comprising the eight-teeth starwheel 3041*c* and the jumper 3041*d* of the wheel assembly 3041 make it possible to ensure movements of the date disc that are multiples of an angle of one thirty-first of a turn, so that an indication of the date graduation 3061 is fully readable through the aperture 307.

A violent impact, that is to say an impact generating a torque causing a strong rotation of the upper date wheel 3041*b*, typically a rotation by an angle corresponding to more than five teeth of the ring 2021 associated with the date disc, could have consequences on the display. Indeed, a strong rotation of the date disc 3051 could generate a rotation of the upper date wheel 3041*b* sufficient for the jumper 3041*d* that it carries to jump a tooth of the date starwheel 3041*c*, in which case a change of the display of the date would occur similarly to what happens during a voluntary correction of the date. In such a case, although the change is involuntary, the indication to be displayed remains centered in the aperture (no shift).

Since the date and day driving wheel assemblies 3041, 3042 are identical, the assembly comprising the eight-teeth starwheel 3042*c* and the jumper 3042*d* of the day driving wheel assembly 3042 ensures the positioning of the upper wheel 3042*b* of this wheel assembly and of the day disc 3052 which meshes with it via the day ring 3022, in an angular position in which an indication of the day graduation 3062 can be fully visible through the aperture 307.

The display mechanism 3 according to the second embodiment of the invention has the advantage of not requiring the superimposition of the discs. This allows them to be positioned as close as possible to the underside of the dial for a better aesthetic appearance.

Such a display mechanism 3 could typically be used to produce a display with a change of the readable disc spontaneously several times a day, to display a first piece of information on predefined time slots and another piece of information the rest of the time, or for a display of the "large date" type with a change of the readable disc spontaneously, for example alternately after twelve days and then after nineteen days, in the case of an inner disc bearing twelve graduations and an outer disc bearing nineteen graduations. It would suffice for that to make the actuation of the lever 309 automatic.

As a variant, the date driving wheel 3041 of the display mechanism 3 according to the second embodiment of the invention could be different from that shown with reference to FIGS. 3 to 7. For example, the starwheel 3041*c* could be fixed relative to the upper date wheel 3041*b* instead of being fixed relative to the lower date wheel 3041*a*. In this case, jumper 3041*d*, engaged in the toothing of the starwheel 3041*c*, would be fixed on the lower date wheel 3041*a* and not on the upper date wheel 3041*b*. The day driving wheel assembly 3042 could be modified in the same way.

More generally, the display mechanism 3 illustrated in FIGS. 3 to 7 comprises:

- a drive pinion 303;
- at least two drive wheel assemblies 3041, 3042, each of them comprising a first toothed wheel coaxial with and rotationally fixed relative to a starwheel and a second toothed wheel coaxial with the first toothed wheel and carrying a jumper engaged in the toothing of the starwheel; and
- first and second concentric and coplanar display discs 3051, 3052, respectively fixed relative to a ring 3021 having an internal toothing and to a ring 3022 having an external toothing, the second disc 3052 typically having a diameter smaller than that of the first disc 3051 and being typically arranged inside the first one,
- the whole being arranged so that said drive pinion 303 meshes simultaneously with one of the first and second toothed wheels of each of said wheel assemblies 3041, 3042, the other toothed wheel of each of these wheel assemblies meshing one with the internal teeth of the ring 3021 associated with said first display disc 3051 and the other with the external teeth of the ring 3022 associated with said second display disc 3052.

It will be noted that this mechanism can be used as a drive mechanism for two discs simultaneously, independently of its capacity to allow the change of the disc the information of which is readable through the aperture, that is to say typically without requiring a mobile support such as the support 301 nor a control means for moving such a support.

Preferably, the toothed wheels of the drive wheel assemblies which mesh respectively with the internal-toothing or external-toothing rings are coplanar.

Advantageously, they are located in the same plane as these rings, and in a space located between these rings 3021, 3022.

Figure 8A:
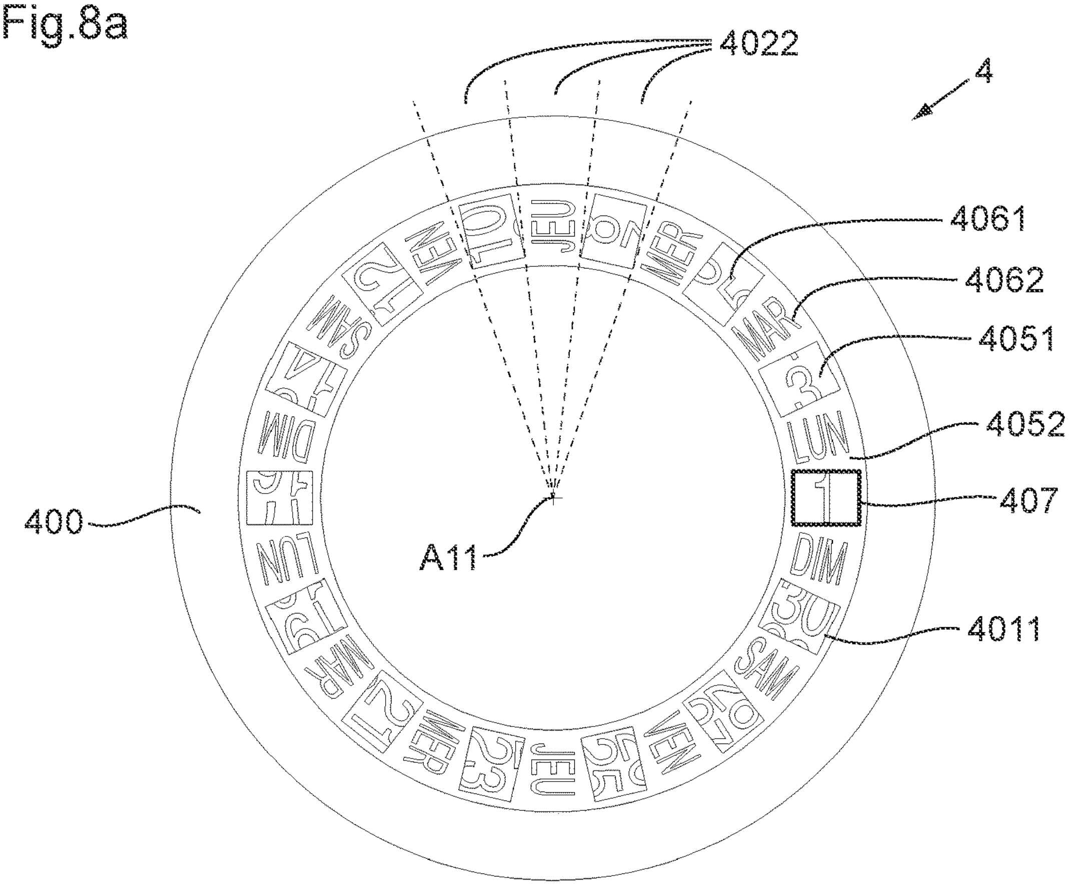
FIGS. 8*a* and 8*b* illustrate, in top view, part of a mechanism according to a third embodiment of the invention in two different configurations reached when an actuating means that it comprises is activated.
Figure 8B:
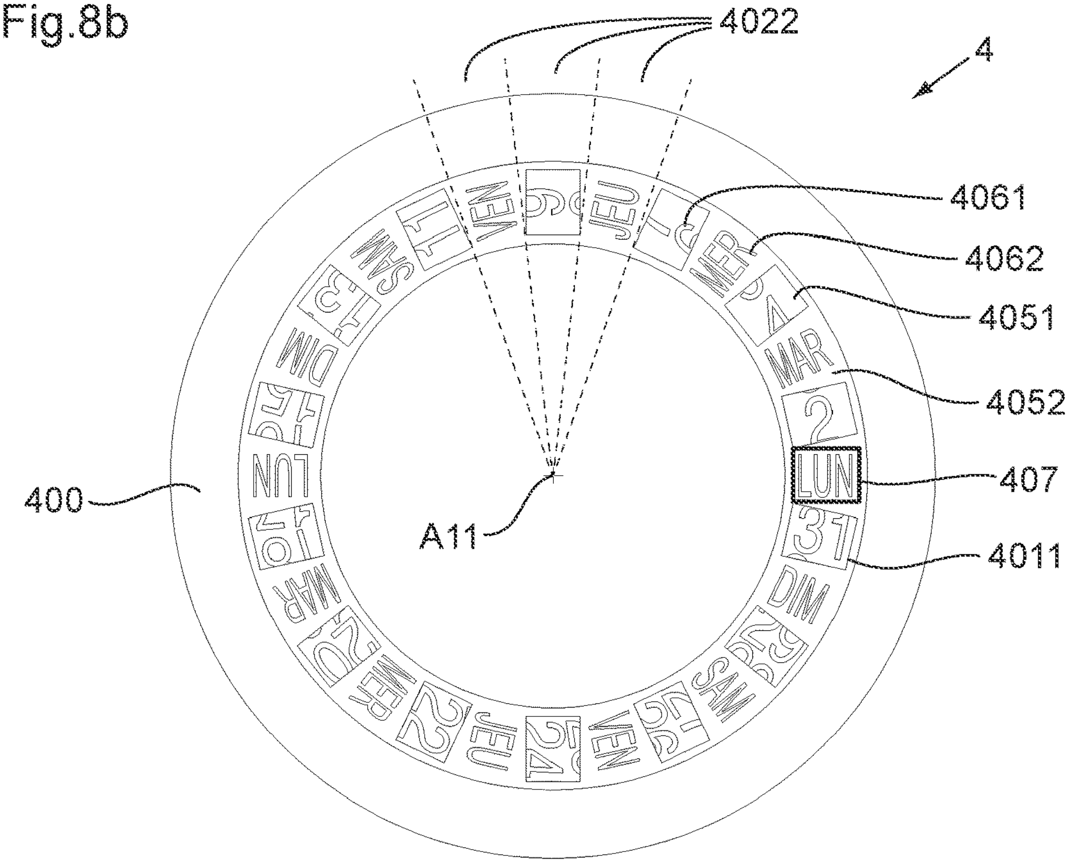

With reference to FIGS. 8*a* and 8*b*, a display mechanism 4 according to a third embodiment of the invention comprises a plate 400, a date disc 4051 and a day disc 4052, which are coaxial around an axis A11 fixed relative to the plate 400.

Such a mechanism 4 is typically incorporated in a timepiece movement, for example in a timepiece such as a pocket watch, a wristwatch, a clock or a miniature clock.

The date disc 4051 is typically an annular disc. It comprises a graduation 4061 comprising thirty-one indications corresponding to the dates ranging from 1 to 31, these indications being uniformly distributed over a circumference of its upper surface and intended to be read through a main aperture 407 the position of which is fixed with respect to the plate 400. Its upper surface is therefore divided into thirty-one identical angular sectors typically of approximately 11.60°, each comprising an indication of the date graduation 4061. The main aperture 407 is typically made in a dial positioned over the discs 4051, 4052. In FIGS. 8*a* and 8*b*, the dial is not shown but the position of the aperture 407 is materialized.

The day disc 4052 covers the date disc 4051. It is typically an annular disc. Its upper surface is divided into twenty-eight identical angular sectors 4022, typically of about 12.85° each. An angular sector 4022 out of two includes an indication corresponding to a day of the week and each of the angular sectors 4022 not including an indication comprises a secondary aperture 4011. The indications borne by the day disc form the graduation 4062 of the day disc 4052 and are partially visible through said secondary apertures 4011. The day display disc 4052 therefore comprises a total of fourteen indications forming the graduation 4062, said indications being uniformly distributed on its upper surface and forming, in chronological order of the days and in the counterclockwise direction, two series of indications of the seven days of the week, two consecutive indications of the days being separated by one of said secondary apertures 4011.

Depending on the angular position of the day display disc 4052, the main aperture 407 makes apparent a date indication or an indication of the day of the week.

The display mechanism 4 comprises two types of reading positions: a first one grouping together the reading positions of the date disc 4051 in which a secondary aperture 4011 of the day disc 4051 is aligned under the main aperture 407 so that an indication of the graduation 4061 of the date disc 4051 is fully readable through the aperture 407, as in the example illustrated in FIG. 8*a*, and a second one grouping together the reading positions of the day disc 4052 in which an indication of the graduation 4062 of the day disc 4052 is fully readable through the aperture 407, as in the example shown in FIG. 8*b*.

The display mechanism 4 makes it possible, at the command of a user, to manually change the disc 4051, 4052 the information of which is readable through the aperture 407 by rotating the day disc 4052 to change from one type of reading position to another.

To this end, the display mechanism 4 comprises a control means (not shown), typically accessible from outside the timepiece in which it is incorporated, and allowing, when it is actuated, to rotate the day display disc 4052 by one twenty-eighth of a turn alternately in one direction then in the other direction.

Such a control means allows for example during a first actuation the passage of the display mechanism 4 from the position illustrated in FIG. 8*a* to the position illustrated in FIG. 8*b* by rotating the day display disc by one twenty-eighth of a turn in the clockwise direction, and then during a second actuation the return of the mechanism 4 from the position illustrated in FIG. 8*b* to that illustrated in FIG. 8*a* by rotating the day display disc by one twenty-eighth of a turn in the counterclockwise direction.

The mechanism 4 is designed so that, regardless of the type of reading position in which it is, every day, typically instantaneously at midnight, the date display disc 4051 performs one thirty-first of a turn in the clockwise direction and the day display disc 4052 performs one fourteenth of a turn in the clockwise direction.

Figure 9A:
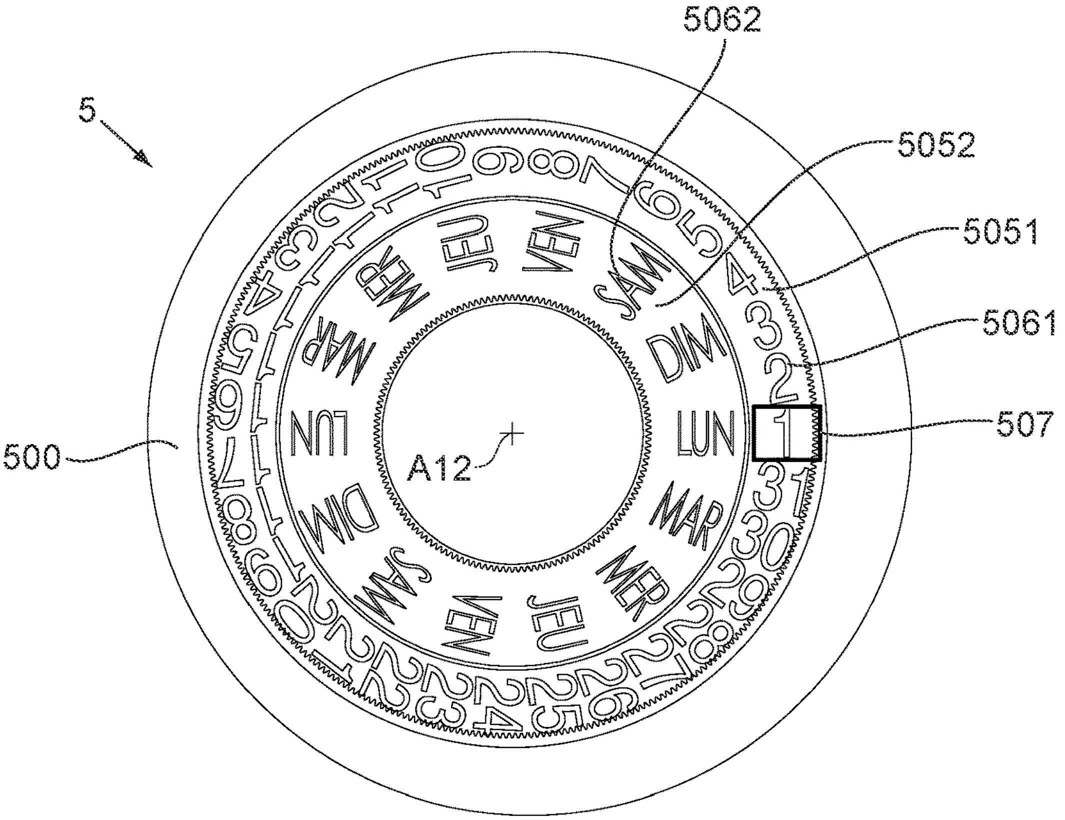
FIGS. 9*a* and 9*b* illustrate, in top view, part of a mechanism according to a fourth embodiment of the invention in two different configurations reached when an actuating means that it comprises is activated.
Figure 9B:
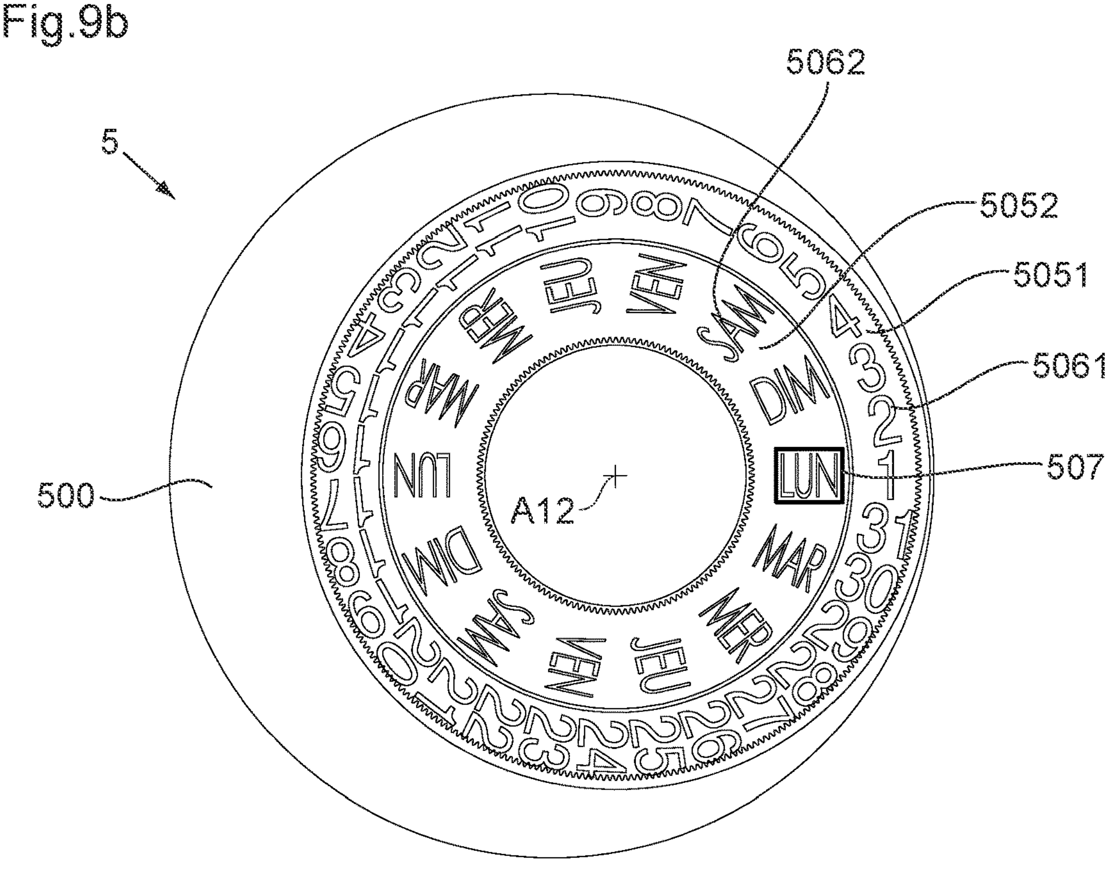

With reference to FIGS. 9*a* and 9*b*, a display mechanism 5 according to a fourth embodiment of the invention comprises a plate 500, a date disc 5051 and a day disc 5052 which are concentric around a center A12 and which bear indications respectively forming a date graduation 5061 and a day graduation 5062, said graduations 5061, 5062 being intended to be read through an aperture 507 which is fixed relative to the plate 500. This aperture 507 is typically produced in a dial positioned above the display discs 5051, 5052. In FIGS. 9*a* to 9*b*, this dial is not shown, but the position of the aperture 507 is materialized.

Advantageously, the date disc 5051 and day disc 5052 are located in the same plane parallel to the plate 500. These are two annular discs. The day disc 5052 has a diameter smaller than the diameter of the date disc 5051 and is arranged inside the latter. The day and date discs are therefore in the same plane, typically parallel to the plate 500.

Such a mechanism 5 is typically incorporated in a timepiece movement, for example in a timepiece such as a pocket watch, a wristwatch, a clock or a miniature clock.

The display mechanism 5 makes it possible, at the command of a user, by means of a control means, to manually change the display disc 5051, 5052 the information of which is readable through the aperture 507 by driving in translation the assembly comprising the date disc 5051 and day disc 5052 as well as their axis A12 in a manner parallel to the plate 500, between two extreme positions.

In the first of these extreme positions, the day disc 5052 is positioned outside the field visible through the aperture 507. It is typically intended to be almost completely or even completely under the dial. The date disc 5051 is positioned with a part facing the aperture 507 so that, when the relative position of the date disc 5051 relative to the aperture 507 allows it, an indication of the graduation 5061 corresponding to the date is fully readable through this aperture 507. This first extreme position corresponds to that illustrated in FIG. 9*a* and will be called "date disc reading position" in the remainder of the description of this embodiment.

In the second of these extreme positions, the date disc 5051 is positioned outside the field visible through the aperture 507. It is typically intended to be almost completely or even completely under the dial. The day disc 5052 is positioned partially facing the aperture 507 so that, when the relative position of the day disc 5052 with respect to the aperture 507 allows it, an indication of the graduation 5062 corresponding to the day of the week is fully readable through this aperture 507. This second extreme position corresponds to that of FIG. 9*b* and will be called "day disc reading position" in the remainder of the description of this embodiment.

The control means (not shown) of the mechanism 5 is typically accessible from outside the timepiece in which it is incorporated. It allows for example, during a first actuation, the driving in translation of the assembly comprising the date disc 5051 and day disc 5052 as well as their axis A12 from the position illustrated in FIG. 9*a* to the position illustrated in FIG. 9*b*, then during a second actuation the return of the mechanism 5 from the position illustrated in FIG. 9*b* to that illustrated in FIG. 9*a* by the opposite translation.

The display mechanism 5 is designed so that, whatever the reading position in which it is (reading position of the date disc or reading position of the day disc), every day, typically instantaneously at midnight, the date display disc 5051 makes one thirty-first of a turn clockwise and the day display disc 5052 makes one fourteenth of a turn counter-clockwise about the axis A12.

The display mechanism 5 is also designed so that the relative position of the set of discs 5051, 5052 with respect to the plate 500 does not impact the daily rotation of the day disc 5052 nor that of the date disc 5051.

The date display disc 5051 and day display disc 5052 could typically be rotated by a mechanism similar to that according to the second embodiment of the invention.

Like the display mechanism 3 according to the second embodiment of the invention, such a display mechanism 5 could typically be used for the realization of a display with a change of the reading disc spontaneously.

Still other display mechanisms for a timepiece comprising several discs bearing indications intended to be read through a fixed aperture and allowing a user to manually change the disc the information of which is readable through said aperture are possible. Examples of such mechanisms will be described below with reference to FIGS. 10*a* to 11*b*.

FIGS. 10*a* to 10*b* and 11*a* to 11*b* respectively illustrate display mechanisms 6, 7 according to a fifth and a sixth embodiment of the invention.

Each of the mechanisms 6, 7 according to the fifth and sixth embodiments comprises a plate 600, 700, a date disc 6051, 7051 comprising thirty-one indications corresponding to the date numbers and forming a graduation 6061, 7061, and a day disc 6052, 7052 comprising seven indications corresponding to the days of the week and forming a graduation 6062, 7062, said graduations 6061, 7061 being intended to be read through an aperture 607, 707 which is fixed relative to the plate 600, 700.

Each of the apertures 607, 707 is typically produced in a dial positioned above the display discs of the mechanism 6, 7 concerned. In FIGS. 10*a* to 11*b*, the dials are not shown but the position of the apertures 607, 707 is materialized.

Advantageously, the date disc 6051, 7051 and the day disc 6052, 7052 are located in the same plane, parallel to the plate 600, 700.

In each of these embodiments, the day disc 6052, 7052 and the date disc 6051, 7051 are able to move, at the command of a user, together in translation in the case of the mechanism 6 or separately in rotation around distinct centers of rotation in the case of the mechanism 7, so as to make apparent through said aperture 607, 707, as desired, an indication of a graduation 6061, 7061 corresponding to the day of the current month or an indication of a graduation 6062, 7062 corresponding to the day of the current week.

Figure 10A:
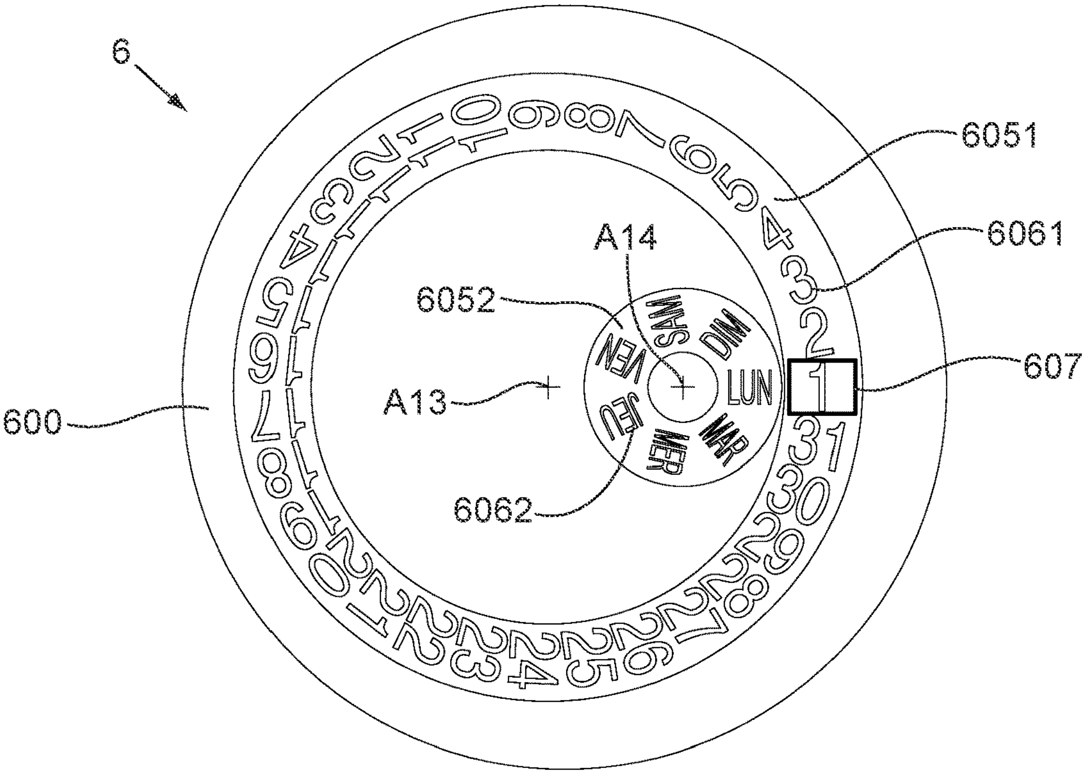
FIGS. 10*a* and 10*b* illustrate, in top view, part of a mechanism according to a fifth embodiment of the invention in two different configurations reached when an actuating means that it comprises is activated.
Figure 10B:
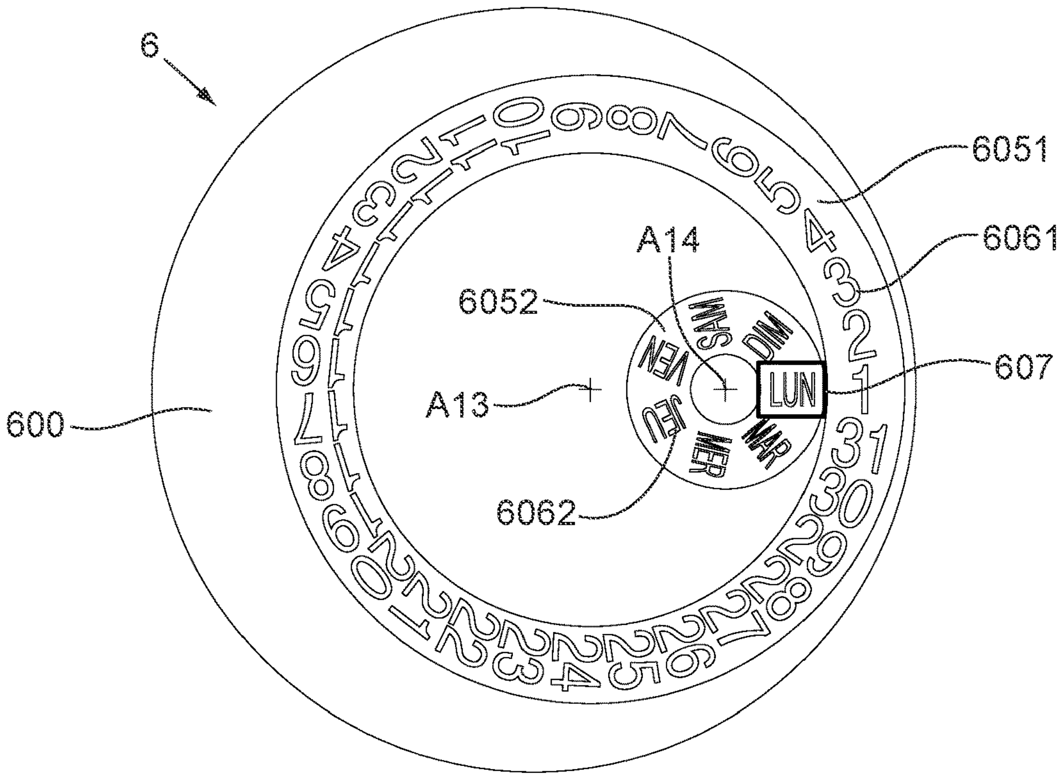

FIGS. 10*a* and 10*b* respectively illustrate the two extreme positions that the day disc 6052 and the date disc 6051 can take when they move in translation, with FIG. 10*a* illustrating the reading position of the date disc 6051 and FIG. 10*b* illustrating the reading position of the day disc 6052.

Figure 11A:
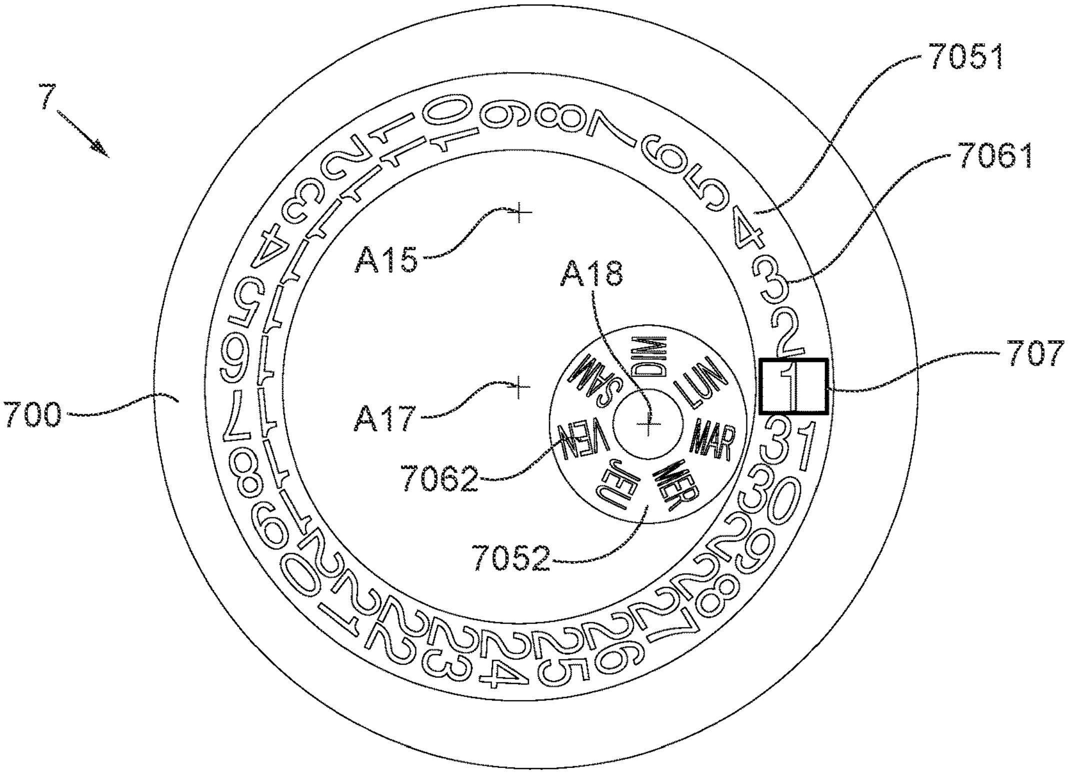
FIGS. 11*a* and 11*b* illustrate, in top view, part of a mechanism according to a sixth embodiment of the invention in two different configurations reached when an actuating means that it comprises is activated.
Figure 11B:
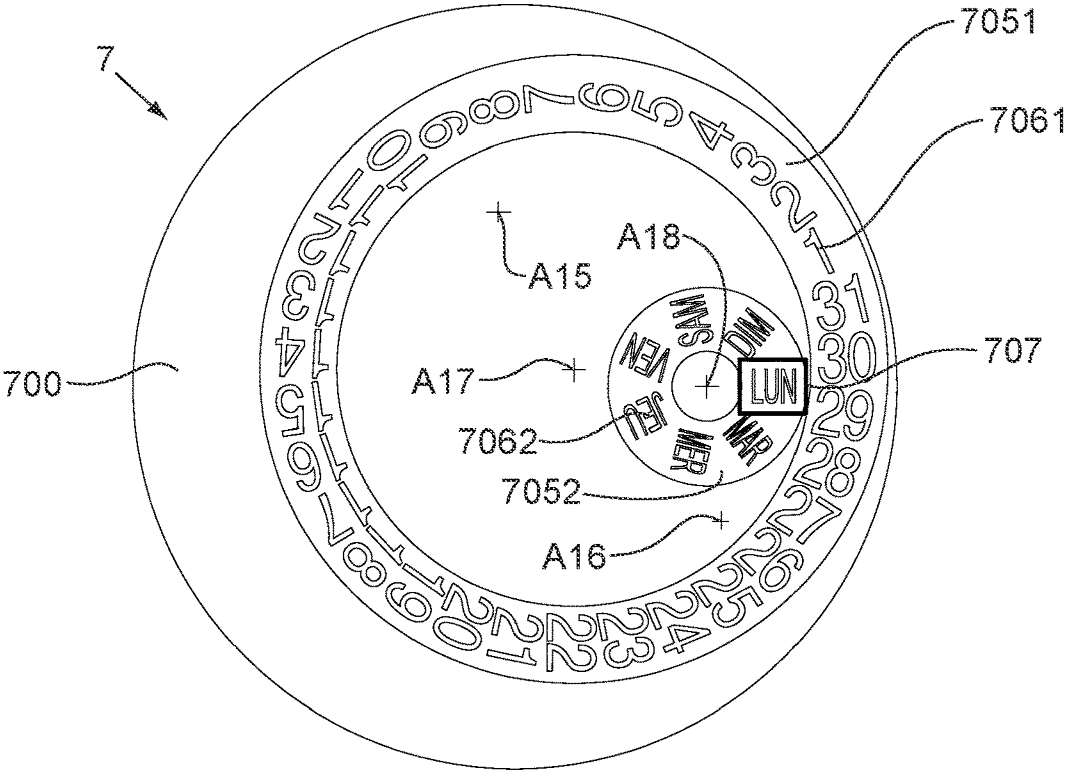

FIGS. 11*a* and 11*b* respectively illustrate the two extreme positions that the date disc 7051 and the days disc 7052 can take when they move in rotation respectively about axes A15 and A16, with FIG. 11*a* illustrating the reading position of the date disc 7051 and FIG. 11*b* illustrating the reading position of the day disc 7052.

Each of the display mechanisms 6, 7 is typically incorporated in a timepiece movement, for example in a timepiece such as a pocket watch, a wristwatch, a clock or a miniature clock.

The display mechanism 6 is designed so that, regardless of the reading position in which it is, every day, typically instantaneously at midnight, the date display disc 6051 performs one thirty-first of a turn clockwise about its axis of rotation A13 and the day display disc 6052 performs one seventh of a turn counterclockwise about its axis of rotation A14.

Likewise, the display mechanism 7 is designed so that, whatever the reading position in which it is, every day, typically instantaneously at midnight, the date display disc 7051 performs one thirty-first of a turn clockwise about its axis of rotation A17 and the day display disc 7052 performs one seventh of a turn counterclockwise about its axis of rotation A18.

It will be clear to those skilled in the art that the present invention is in no way limited to the embodiments presented above and illustrated in the figures.

Regardless of the embodiment of the invention implemented, the display discs of the display mechanism according to the invention can allow the display of information other than the date or the day of the week. For example, the names of the day of the week and of the current month, the day of the week and the number of the week, the day of the week and the moon age, the day of the week and the information according to which we are in the morning or in the afternoon (AM/PM), the day of the week and a second time zone, the date and the indication whether the year is a leap year or not, any indication and its translation into another language or any other combination of these pieces of information. It is also possible to envisage displaying chronograph information, an equation of time, a power reserve, information relating to an alarm such as, for example, information ON and OFF, all information relating to the date and its derivatives or else to a second or a third time zone.

As a variant, more than two different pieces of information could be displayed alternately in the same aperture. For this, as many display discs as additional pieces of information desired would typically be added to the display mechanism according to the invention, for example by superimposing discs whose center of rotation is movable such as the day disc 1052 described in the first embodiment of the invention or by adding at least one display disc that is concentric and coplanar with the other two in the mechanism according to the second embodiment of the invention.

The embodiments described could also be combined.

Whatever the embodiment implemented, the display mechanism according to the invention allows the display of at least two different pieces of information alternately in the same aperture. This allows not to overload the dial with multiple apertures while offering the user the possibility to learn about different pieces of information.

When the control means can be operated manually by the user, the latter is able, by actuating this control means, to change the information readable through the aperture at any time, at least occasionally.

Such a mechanism can be in particular useful for displaying at least one additional piece of information, for example necessary for the operation of a perpetual calendar mechanism with simple display (which only displays the date), for correction purposes only. The mechanism would then allow for example the display of the current month during its correction, this piece of information being visible through the aperture only for its correction.

When the different discs that can be presented under the dial are located in the same plane, this has the advantage of reducing the thickness of the timepiece mechanism and also has an aesthetic advantage. This is because discs located as close as possible to the underside the dial are preferred.

Whatever the embodiment of the invention, the plate can be replaced by another frame, fixed or mobile, for example a bridge.

The invention claimed is:

1. Display mechanism for a timepiece, comprising a frame, an aperture which is fixed relative to the frame in a non-moveable manner and a first and a second display disc each bearing indications, wherein the display mechanism enables displaying the indications of the first and second discs alternately through said aperture, wherein said first and second discs are coplanar.

2. The display mechanism according to claim 1, wherein said mechanism comprises at least one control means which can be manually actuated by the user of said timepiece to change the disc at least one indication of which is readable through said aperture.

3. The display mechanism according to claim 2, wherein the display mechanism enables, by actuating said control means, the movement in translation, in rotation or along a trajectory combining rotation and translation of at least said first disc.

4. The display mechanism according to claim 1, wherein said first and second discs are concentric.

5. The display mechanism according to claim 3, further comprising at least a first movable support carrying at least said first disc, said movable support being able to perform alternating movements of translation or rotation between a first and a second predetermined position, which are fixed relative to the frame, the first predetermined position allowing the reading of at least one indication borne by said first disc through the aperture and the second predetermined position allowing the reading of at least one indication borne by said second disc through the aperture.

6. The display mechanism according to claim 5, wherein said control means allows said first movable support to pass from the first predetermined position to the second predetermined position.

7. The display mechanism according to claim 1, further comprising a mechanism for correcting the indication(s) visible through the aperture.

8. The display mechanism according to claim 7, wherein said correction mechanism is controlled by a control member, the actuation of which is necessary for every occurrence to change the disc of which at least one indication is visible through said aperture.

9. The display mechanism according to claim 5, wherein said first movable support carries said first and second discs.

10. The display mechanism according to claim 9, wherein said first and second discs are concentric, coplanar and respectively fixed relative to a ring having an internal toothing and to a ring having an external toothing, said display mechanism further comprising a drive pinion intended to be kinematically connected to a going train of a timepiece movement of said timepiece, said drive pinion being fixed relative to the frame; wherein said alternating movements of said first movable support between said first and second predetermined positions are rotational movements about an axis of rotation that is coincident with the axis of rotation of the drive pinion; and wherein said first movable support also carries at least two drive wheel assemblies, each of them comprising a first toothed wheel coaxial with and rotationally fixed relative to a starwheel and a second toothed wheel coaxial with the first toothed wheel and carrying a jumper engaged in the toothing of the starwheel, the display mechanism being arranged so that said drive pinion meshes simultaneously with one of the first and second toothed wheels of each of said wheel assemblies, the other toothed wheel of each of these wheel assemblies meshing one with the internal toothing of the ring associated with said first disc and the other with the external toothing of the ring associated with said second disc to put said first and second discs in rotation relative to the support when the drive pinion pivots about the drive pinion's axis of rotation.

11. The display mechanism according to claim 10, further comprising a third toothed wheel intended to be driven in rotation about an axis of rotation which is fixed relative to the frame in order to correct the indication(s) visible through the aperture, this third toothed wheel meshing with the toothing of the ring associated with the first disc to drive the first disc in rotation about the axis when the movable support is in the first predetermined position and meshing with the toothing of the ring associated with the second disc to drive the second disc in rotation about the axis when the movable support is in the second predetermined position.

12. The display mechanism according to claim 5, wherein in the first predetermined position said first disc covers at least the part of said second disc located facing the aperture and wherein in the second predetermined position said first disc does not cover the part of said second disc located facing the aperture.

13. The display mechanism according to claim 12, wherein said first disc is movable in rotation about an axis which is fixed relative to said first movable support, and wherein said second disc is movable in rotation about an axis which is fixed relative to the frame.

14. The display mechanism according to claim 3, wherein said first and second discs are superimposed and intended to pivot about a common axis of rotation which is fixed relative to the frame, the upper disc comprising at least one other aperture, the display mechanism being arranged so that said control means allows the upper disc to be pivoted so as to position in front of the aperture, as desired, either at least one indication of the upper disc so that said indication is readable through the aperture, or the other aperture or one of said other apertures so that at least one indication of the lower disc is readable through the aperture.

15. Timepiece movement comprising a mechanism according to claim 1.

16. Timepiece comprising the timepiece movement according to claim 15.

17. The display mechanism according to claim 1, wherein the display mechanism enables movement in translation, in rotation or along a trajectory combining rotation and translation of at least said first disc.

18. The display mechanism according to claim 2, wherein said first and second discs are coplanar.

19. The display mechanism according to claim 3, wherein said first and second discs are coplanar.

* * * * *